(12) United States Patent
McMinn

(10) Patent No.: US 6,219,760 B1
(45) Date of Patent: *Apr. 17, 2001

(54) CACHE INCLUDING A PREFETCH WAY FOR STORING CACHE LINES AND CONFIGURED TO MOVE A PREFETCHED CACHE LINE TO A NON-PREFETCH WAY UPON ACCESS TO THE PREFETCHED CACHE LINE

(75) Inventor: Brian D. McMinn, Buda, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,891

(22) Filed: Apr. 26, 2000

Related U.S. Application Data

(63) Continuation of application No. 08/884,434, filed on Jun. 27, 1997, now Pat. No. 6,138,213.

(51) Int. Cl.[7] .............................. G06F 12/00; G06F 13/00
(52) U.S. Cl. .............................. 711/137; 711/3; 711/118; 711/154; 712/237
(58) Field of Search .............................. 711/3, 118, 123, 711/136, 137, 147, 154, 155, 207, 237

(56) References Cited

U.S. PATENT DOCUMENTS

| | | |
|---|---|---|
| 5,293,609 | 3/1994 | Shih et al. . |
| 5,361,391 | 11/1994 | Westberg . |
| 5,371,870 | 12/1994 | Goodwin et al. . |
| 5,524,220 | 6/1996 | Verma et al. . |
| 5,530,833 | 6/1996 | Iyengar et al. . |
| 5,537,573 | 7/1996 | Ware et al. . |
| 5,586,295 | 12/1996 | Tran . |
| 5,619,676 * | 4/1997 | Fukuda et al. ........................ 711/137 |
| 5,680,564 | 10/1997 | Divivier et al. . |
| 5,732,242 | 3/1998 | Mowry . |

(List continued on next page.)

OTHER PUBLICATIONS

Mowry, "Tolerating Latency through Software–Controlled Data Prefetching," A Dissertation Submitted to the Department of Electrical Engineering and the Committee on Graduate Studies of Stanford University in Partial Fulfillment of the Requirements for the Degree of Doctor of Philosophy, pp. 121–176.

*Primary Examiner*—Tuan V. Thai
(74) *Attorney, Agent, or Firm*—Conley, Rose & Tayon, PC; Lawrence J. Merkel

(57) ABSTRACT

A cache employs one or more prefetch ways for storing prefetch cache lines and one or more ways for storing accessed cache lines. Prefetch cache lines are stored into the prefetch way, while cache lines fetched in response to cache misses for requests initiated by a microprocessor connected to the cache are stored into the non-prefetch ways. Accessed cache lines are thereby maintained within the cache separately from prefetch cache lines. When a prefetch cache line is presented to the cache for storage, the prefetch cache line may displace another prefetch cache line but does not displace an accessed cache line. A cache hit in either the prefetch way or the non-prefetch ways causes the cache line to be delivered to the requesting microprocessor in a cache hit fashion. The cache is further configured to move prefetch cache lines from the prefetch way to the non-prefetch way if the prefetch cache lines are requested (i.e. they become accessed cache lines). Instruction cache lines may be moved immediately upon access, while data cache line accesses may be counted and a number of accesses greater than a predetermined threshold value may occur prior to moving the data cache line from the prefetch way to the non-prefetch way. Additionally, movement of an accessed cache line from the prefetch way to the non-prefetch way may be delayed until the accessed cache line is to be replaced by a prefetch cache line.

20 Claims, 6 Drawing Sheets

U.S. PATENT DOCUMENTS

| | | |
|---|---|---|
| 5,740,399 | 4/1998 | Mayfield et al. . |
| 5,765,190 | 6/1998 | Circello et al. . |
| 5,774,685 | 6/1998 | Dubey . |
| 5,809,529 | 9/1998 | Mayfield . |
| 5,926,830 * | 7/1999 | Feiste ................................... 711/122 |
| 5,956,746 * | 9/1999 | Wang ..................................... 711/137 |
| 6,021,467 * | 2/2000 | Konigsburg et al. ................. 711/122 |
| 6,108,753 * | 8/2000 | Bossen et al. ........................ 711/118 |
| 6,119,203 * | 9/2000 | Snyder et al. ........................ 711/137 |

* cited by examiner

CACHE INCLUDING A PREFETCH WAY FOR STORING CACHE LINES AND CONFIGURED TO MOVE A PREFETCHED CACHE LINE TO A NON-PREFETCH WAY UPON ACCESS TO THE PREFETCHED CACHE LINE

This application is a continuation of U.S. patent application Ser. No. 08/884,434, filed Jun. 27, 1997, now U.S. Pat. No. 6,138,213 (which includes a continued prosecution application filed Dec. 6, 1999).

BACKGROUND OF THE INVENTION

1. Field of the Invention

The present invention is related to computer systems and, more particularly, to prefetching and caching mechanisms within computer systems.

2. Description of the Related Art

Superscalar microprocessors achieve high performance by executing multiple instructions per clock cycle and by choosing the shortest possible clock cycle consistent with the design. On the other hand, superpipelined microprocessor designs divide instruction execution into a large number of subtasks which can be performed quickly, and assign pipeline stages to each subtask. By overlapping the execution of many instructions within the pipeline, superpipelined microprocessors attempt to achieve high performance.

Superscalar microprocessors demand high memory bandwidth due to the number of instructions attempting concurrent execution and due to the increasing clock frequency (i.e. shortening clock cycle) employed by the superscalar microprocessors. Many of the instructions include memory operations to fetch (read) and update (write) memory operands. The memory operands must be fetched from or conveyed to memory, and each instruction must originally be fetched from memory as well. Similarly, superpipelined microprocessors demand high memory bandwidth because of the high clock frequency employed by these microprocessors and the attempt to begin execution of a new instruction each clock cycle. It is noted that a given microprocessor design may employ both superscalar and superpipelined techniques in an attempt to achieve the highest possible performance characteristics.

Microprocessors are often configured into computer systems which have a relatively large, relatively slow main memory. Typically, multiple dynamic random access memory (DRAM) modules comprise the main memory system. The large main memory provides storage for a large number of instructions and/or a large amount of data for use by the microprocessor, providing faster access to the instructions and/or data than may be achieved from a disk storage, for example. However, the access times of modern DRAMs are significantly longer than the clock cycle length of modern microprocessors. The memory access time for each set of bytes being transferred to the microprocessor is therefore long. Accordingly, the main memory system is not a high bandwidth system. Microprocessor performance may suffer due to a lack of available memory bandwidth.

In order to allow high bandwidth memory access (thereby increasing the instruction execution efficiency and ultimately microprocessor performance), computer systems typically employ one or more caches to store the most recently accessed data and instructions. Additionally, the microprocessor may employ caches internally. A relatively small number of clock cycles may be required to access data stored in a cache, as opposed to a relatively larger number of clock cycles are required to access the main memory.

High memory bandwidth may be achieved in a computer system if the cache hit rates of the caches employed therein are high. An access is a hit in a cache if the requested data is present within the cache when the access is attempted. On the other hand, an access is a miss in a cache if the requested data is absent from the cache when the access is attempted. Cache hits are provided to the microprocessor in a small number of clock cycles, allowing subsequent accesses to occur more quickly as well and thereby increasing the available bandwidth. Cache misses require the access to receive data from the main memory, thereby lowering the available bandwidth.

In order to increase cache hit rates, computer systems may employ prefetching to "guess" which data will be requested by the microprocessor in the future. The term prefetch, as used herein, refers to transferring data (e.g. a cache line) into a cache prior to a request for the data being received by the cache. A "cache line" is a contiguous block of data which is the smallest unit for which a cache allocates and deallocates storage. Generally, prefetch algorithms are based upon the pattern of accesses which have been performed by the microprocessor. If the prefetched data is later accessed by the microprocessor, then the cache hit rate may be increased due to transferring the prefetched data into the cache before the data is requested.

Unfortunately, cache hit rates may be decreased (or alternatively cache miss rates increased) by performing prefetching if the data being prefetched is not later accessed by the microprocessor. A cache is a finite storage resource, and therefore the prefetched cache lines generally displace cache lines stored in the cache. When a particular prefetched cache line displaces a particular cache line in the cache, the prefetched cache line is not later accessed by the microprocessor, and the particular cache line is later accessed by the microprocessor, then a miss is detected for the particular cache line. The miss is effectively caused by the prefetch operation. The process of displacing a later-accessed cache line with a non-referenced prefetched cache line is referred to herein as cache pollution. A mechanism for performing prefetch without incurring cache pollution is desired.

SUMMARY OF THE INVENTION

The problems outlined above are in large part solved by a cache in accordance with the present invention. The cache employs one or more prefetch ways for storing prefetch cache lines and one or more ways for storing accessed cache lines. Prefetch cache lines are stored into the prefetch way, while cache lines fetched in response to cache misses for requests initiated by a microprocessor connected to the cache are stored into the non-prefetch ways. Advantageously, accessed cache lines are maintained within the cache separately from prefetch cache lines. When a prefetch cache line is presented to the cache for storage, the prefetch cache-line may displace another prefetch cache line but does not displace an accessed cache line. In other words, cache pollution is avoided by storing prefetch cache lines separate from accessed cache lines. A cache hit in either the prefetch way or the non-prefetch ways causes the cache line to be delivered to the requesting microprocessor in a cache hit fashion. Cache hit rates may be beneficially increased due to the presence of prefetch data in the cache, while the detrimental effects of cache pollution are avoided.

The cache is further configured to move prefetch cache lines from the prefetch way to the non-prefetch way if the prefetch cache lines are requested (i.e. they become accessed cache lines). A variety of mechanisms are described herein. Instruction cache lines may be moved immediately upon access, while data cache line accesses may be counted and a number of accesses greater than a predetermined threshold value may occur prior to moving the data cache line from the prefetch way to the non-prefetch way. Treating data and instruction cache lines differently may further avoid the effects of cache pollution by not moving infrequently accessed data cache lines into the non-prefetch way. Additionally, movement of an accessed cache line from the prefetch way to the non-prefetch way may be delayed until the accessed cache line is to be replaced by a prefetch cache line. Advantageously, the number of accessed cache lines stored in the cache may be temporarily increased when a prefetch cache line becomes an accessed cache line.

By providing a prefetch way within the cache for prefetch cache lines, the cache described herein uses the same channel for returning a cache hit of prefetch data to the requesting processor as is used for returning a cache hit of previously accessed data. Using the same channel may engender cost savings over implementations which employ a special channel for prefetch data return.

Broadly speaking, the present invention contemplates a cache comprising a storage coupled to a control unit. The storage includes at least a first way for storing cache lines and at least one prefetch way for storing prefetch cache lines. The control unit is configured to store a first prefetch cache line into the prefetch way, and is further configured to move the first prefetch cache line into the first way if the prefetch cache line is requested from the cache.

The present invention further contemplates a method for prefetching data in a computer system. A first prefetched cache line is stored into a prefetch way of a cache having at least a first way in addition to the prefetch way. The prefetch way is used to store only prefetched cache lines. The first prefetched cache line is moved into the first way upon receiving a request for the first prefetched cache line in the cache.

Furthermore, the present invention contemplates a computer system comprising a microprocessor coupled to a cache. The cache includes a prefetch way and at least a first way. The cache is configured to store a prefetched cache line into the prefetch way, and is further configured to move the prefetched cache line into the first way if the microprocessor accesses the prefetched cache line within the prefetch way.

BRIEF DESCRIPTION OF THE DRAWINGS

Other objects and advantages of the invention will become apparent upon reading the following detailed description and upon reference to the accompanying drawings in which.

Figure 1:
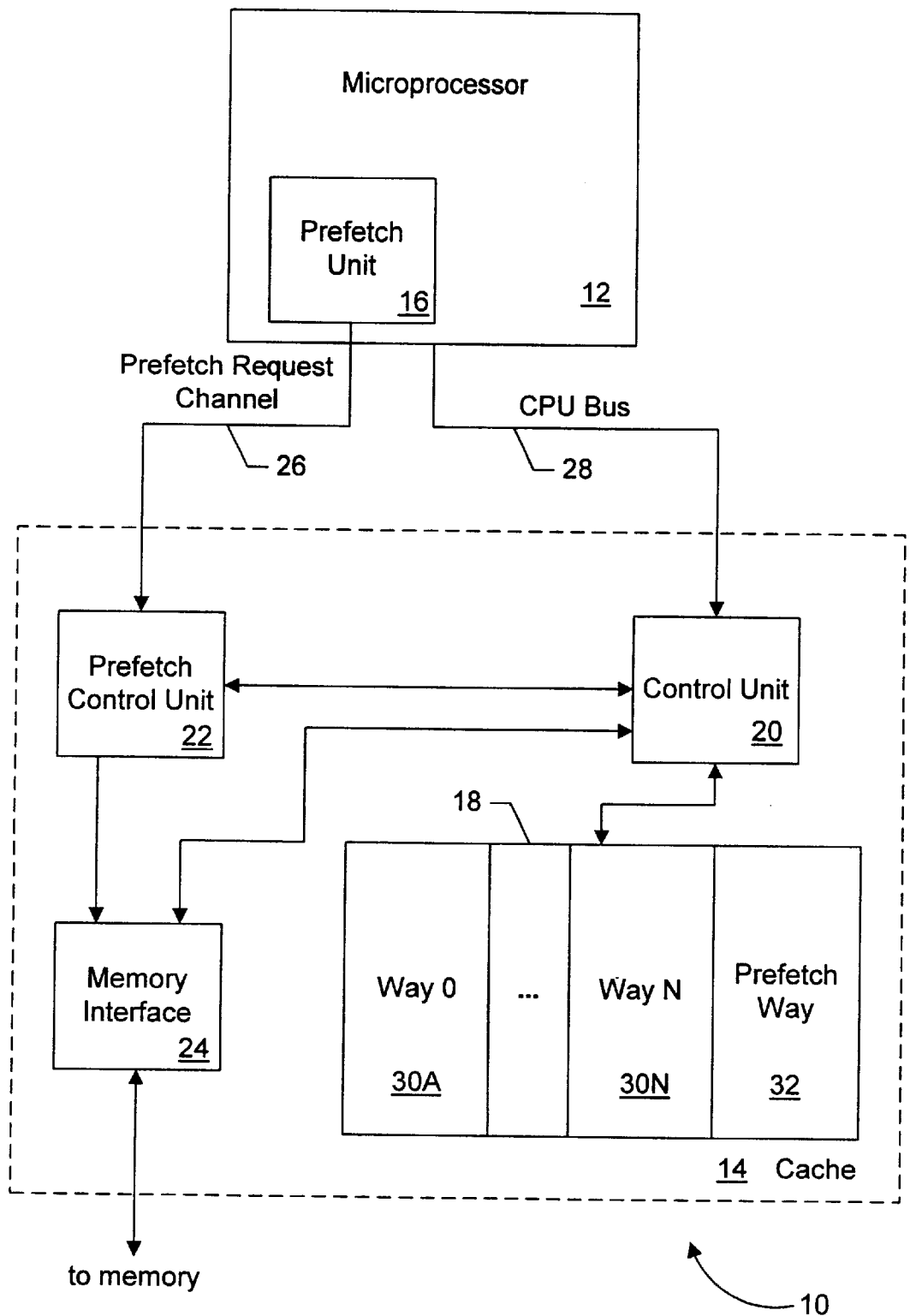
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a computer system 10 is shown. Computer system 10 includes a microprocessor 12 and a cache 14. As shown in FIG. 1, microprocessor 12 includes a prefetch unit 16. Similarly, cache 14 includes a cache storage 18, a control unit 20, a prefetch control unit 22, and a memory interface 24. A prefetch request channel 26 is coupled between prefetch unit 16 and prefetch control unit 22. A CPU bus 28 is coupled between microprocessor 12 and control unit 20. Additionally, control unit 20 is coupled to prefetch control unit 22, memory interface 24, and cache storage 18. Prefetch control unit 22 is coupled to memory interface 24 as well, and memory interface 24 is coupled to a memory (not shown).

Generally speaking, cache storage 18 includes a plurality of ways 30A–30N and at least one prefetch way 32. Ways 30A–30N store cache lines, each of which includes data which has been previously requested by microprocessor 12. Prefetch way 32 is used to store prefetch cache lines. The prefetch cache lines are prefetched from the memory in accordance with a prefetch algorithm employed within computer system 10.

Control unit 20 is configured to transfer a prefetch cache line from prefetch way 32 to one of ways 30A–30N upon access to the prefetch cache line by microprocessor 12. Control unit 20 may perform the transfer in a different fashion for instruction cache lines versus data cache lines. Instruction cache lines are cache lines containing instructions to be executed by microprocessor 12, while data cache lines are cache lines containing data to be operated upon by microprocessor 12 in response to the instructions being executed.

According to one embodiment of control unit 20, an instruction cache line is eligible for movement from prefetch way 32 to ways 30A–30N if the instruction cache line is accessed. Instructions, once accessed, are likely to be accessed again during the execution of a program. Data, on the other hand, is oftentimes accessed once. Therefore, an access to a data cache line may not indicate that another access to the data cache line is likely. Prefetch way 32 may include storage for a counter corresponding to each prefetch cache line. Upon access to a prefetch cache line which is data, the corresponding counter may be incremented. If the counter exceeds a predetermined threshold value, then the data cache line is eligible transfer to one of ways 30A–30N. Microprocessor 12 indicates if a given request is instruction or data via control signals upon CPU bus 28.

By placing prefetch cache lines into prefetch way 32 and transferring the prefetch cache lines into ways 30A–30N if the prefetch cache lines are actually accessed, control unit 20 may advantageously prevent pollution of the cached data (in ways 30A–30N) with prefetch data. Cache lines stored in ways 30A–30N have been accessed by microprocessor 12, and are not displaced by prefetch cache lines until the prefetch cache lines are accessed. Therefore, cache 14 may enjoy the increased hit rates made possible by prefetching without suffering the cache pollution consequences often associated with prefetching.

Control unit 20 may additionally be configured to delay the transfer of an accessed cache line from prefetch way 32 to ways 30A–30N until the accessed cache line is to be replaced within prefetch way 32 by another prefetch cache line. In this manner, accessed cache lines may be stored within prefetch way 32 even though the accessed cache lines are no longer speculatively prefetched cache lines. The number of accessed cache lines which may be concurrently stored within cache 14 is thereby increased. Cache hit rates may be increased still further using the delayed transfer embodiment.

Cache storage 18 is configured with a set-associative structure as shown in FIG. 1. A set-associative structure is a two dimensional array of cache lines. The cache line corresponding to a particular address is stored into the set-associative structure on a particular row. The row of the structure is selected by decoding a portion of the address, referred to as the index. The index may comprise the least significant bits of the address, excluding those bits which define an offset within the cache line. The columns of the set-associative structure are ways 30A–30N and prefetch way 32. Each way 30A–30N and 32 includes a storage location within each row which is large enough to store a cache line and the corresponding cache tag. Exemplary cache tags are shown below. Generally, an accessed cache line 30A–30N may be stored within any of ways 30A–30N within the row indexed by the corresponding address. Prefetch way 32 is reserved for storing prefetch cache lines. In one embodiment, an accessed cache line which was originally prefetched may be stored within prefetch way 32 until a subsequent prefetch cache line is stored into prefetch way 32 and the subsequent prefetch cache line has the same index as the accessed cache line.

In addition to controlling the transfer of cache lines between prefetch way 32 and ways 30A–30N, control unit 20 is configured to manage cache storage 18. Requests for cache lines are conveyed by microprocessor 12 upon CPU bus 28, and control unit 20 determines if the requested cache lines hit within cache storage 18. If a hit is detected (even if the hit is within prefetch way 32), the cache line is returned to microprocessor 12 via CPU bus 28. On the other hand, if a miss is detected, control unit 20 conveys the request to memory interface 24 which transfers the cache line from the memory. The cache line is stored into one of ways 30A–30N and is returned to microprocessor 12 via CPU bus 28.

When a cache miss is detected for a memory operation conveyed upon CPU bus 28, control unit 20 allocates one of ways 30A–30N for storing the missing cache line when the missing cache line is transferred from the memory to cache 14. According to one embodiment, control unit 20 may employ a least recently used (LRU) replacement strategy for allocating a cache line for replacement. In an LRU strategy, the cache lines within a row are ranked according to most recent access by microprocessor 12. When a particular cache line is accessed, it is marked as most recently used. The previous most recently used cache line is marked as second most recently used, etc. When a cache line is to be selected for replacement, the cache line marked least recently used is selected.

According to one embodiment, control unit 20 maintains LRU data for ways 30A–30N. When a cache miss is detected, the LRU cache line is displaced in favor of the missing cache line (which is marked most recently used when stored into cache storage 18). Similarly, control unit 20 may select the LRU cache line for displacement when the prefetch cache line within the row is selected for movement into ways 30A–30N.

Microprocessor 12 is configured to transmit prefetch requests to cache 14 via prefetch request channel 26. Microprocessor 12 employs a prefetch unit 16 which implements a prefetch algorithm. Any prefetch algorithm may be employed in various embodiments of microprocessor 12. For example, microprocessor 12 may generate prefetch addresses of cache lines which are sequential to a cache line which misses in an internal cache of microprocessor 12. Alternatively, prefetch unit 16 may monitor the pattern of addresses being accessed by microprocessor 12 and generate prefetch addresses based upon the detected pattern. For example, prefetch unit 16 may employ a stride prefetching algorithm. Any suitable prefetching algorithm may be employed.

Prefetch control unit 22 receives prefetch requests from prefetch request channel 26. Prefetch control unit 22 may be configured to transmit the address of the prefetch request to control unit 20 in order to determine if the prefetch request hits in cache 14 already. If a miss is detected, prefetch control unit 22 directs memory interface 24 to read the prefetch cache line from the memory. Memory interface 24, when returning a cache line to control unit 20 for storage, indicates whether or not the cache line is a prefetch cache line. Control unit 20 determines whether or not to place the cache line in prefetch ways 32 via the indication from memory interface 24. Alternatively, prefetch control unit 22 may employ the prefetch algorithm and prefetch unit 16 and prefetch request channel 26 may be eliminated. In another alternative, prefetch request channel 26 may be eliminated and CPU bus 28 may be used for transmitting both prefetch requests and memory operations requesting data.

It is noted that, although a single prefetch way 32 is shown in FIG. 1, multiple prefetch ways may be employed in other embodiments. Control unit 20 may employ a separate LRU replacement strategy for the multiple prefetch ways for storing prefetched data. It is further noted that cache 14 may be implemented as a lookaside cache, an inline cache, or any other suitable access structure.

Figure 2:
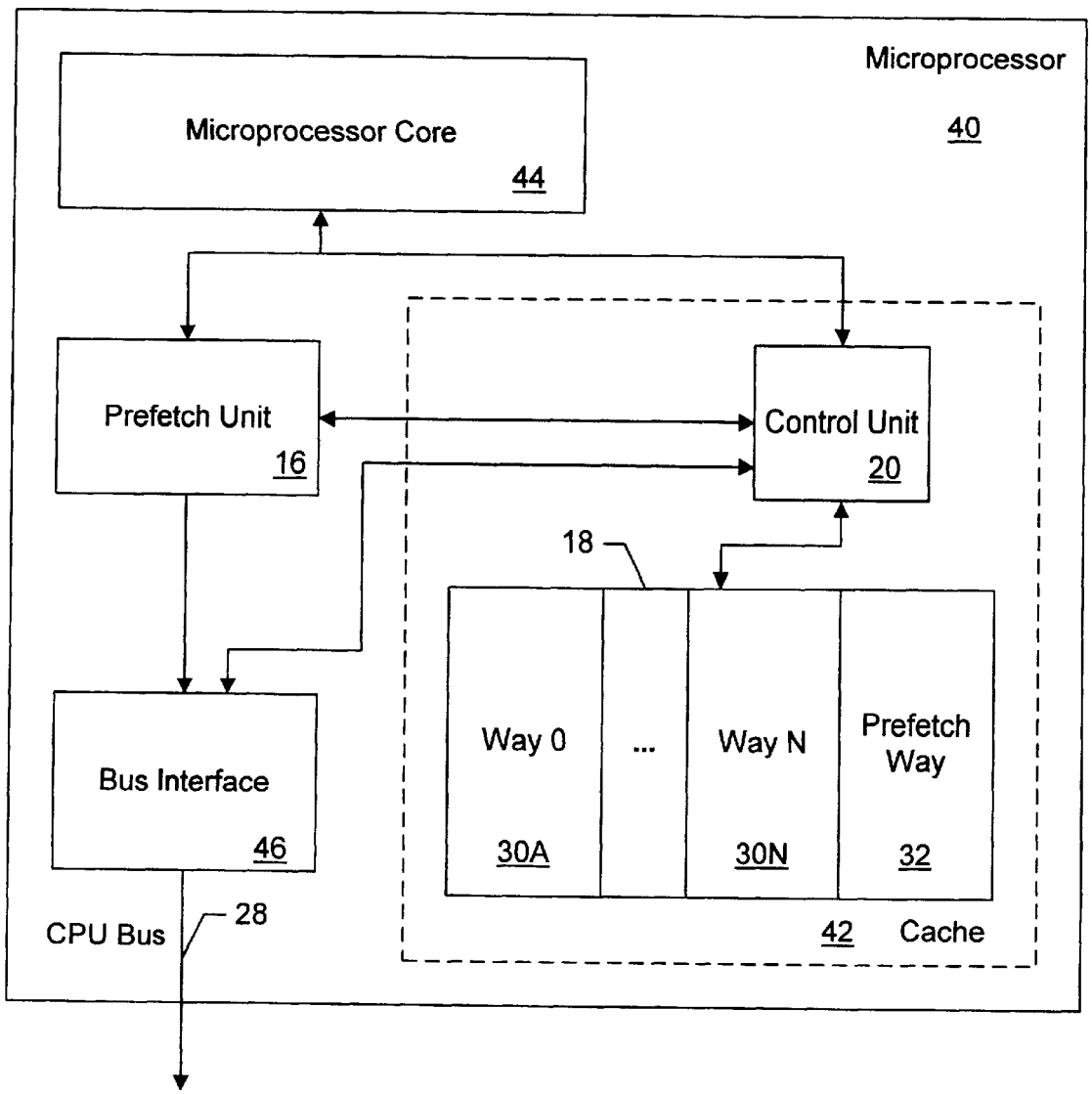
FIG. 2 is a block diagram of one embodiment of a central processing unit.

Turning next to FIG. 2, a second embodiment of a microprocessor 40 is shown. Microprocessor 40 includes an internal cache 42, a microprocessor core 44, prefetch unit 16 and a bus interface unit 46. Microprocessor core 44 is coupled to control unit 20 within cache 42 and to prefetch unit 16. Prefetch unit 16 is coupled to bus interface unit 46 and control unit 20. Control unit 20 is coupled to bus interface 46 and cache storage 18 (which includes ways 30A–30N and prefetch way 32). Bus interface 46 is coupled to CPU bus 28.

Cache 42 employs control unit 20 and cache storage 18, similar to cache 14 in FIG. 1. Control unit 20 and cache storage 18 operate similar to the description of FIG. 1, except that addresses are received from microprocessor core 44 and prefetch unit 16.

Microprocessor core 44 includes circuitry for executing instructions in accordance with a microprocessor architecture to which microprocessor 40 is implemented. For example, microprocessor 40 may employ the x86 microprocessor architecture. Alternatively, microprocessor 40 may employ the Power PC, DEC Alpha, or MIPS microprocessor architectures or any other microprocessor architecture.

Microprocessor core 44 provides instruction fetch addresses and data fetch addresses to prefetch unit 16 and control unit 20. Control unit 20 provides the corresponding data if the address is a hit in cache 42 or causes the address to be fetched via CPU bus 28 from the memory (not shown), as described above. Prefetch unit 16 monitors the addresses for pattern detection in order to generate prefetch requests, as described above.

Bus interface 46 is used to communicate between microprocessor 40 and devices attached to CPU bus 28 (such as a memory or bus bridge).

It is noted that separate instruction and data caches may be employed by microprocessor 40. Each cache may be similar to cache 42. Alternatively, one or the other of the instruction and data caches may be a standard cache (i.e. omitting a prefetch way such as cache 42 employs). Furthermore, microprocessor 40 may employ prefetch request channel 26 similar to microprocessor 12 shown in FIG. 2.

Figure 3:
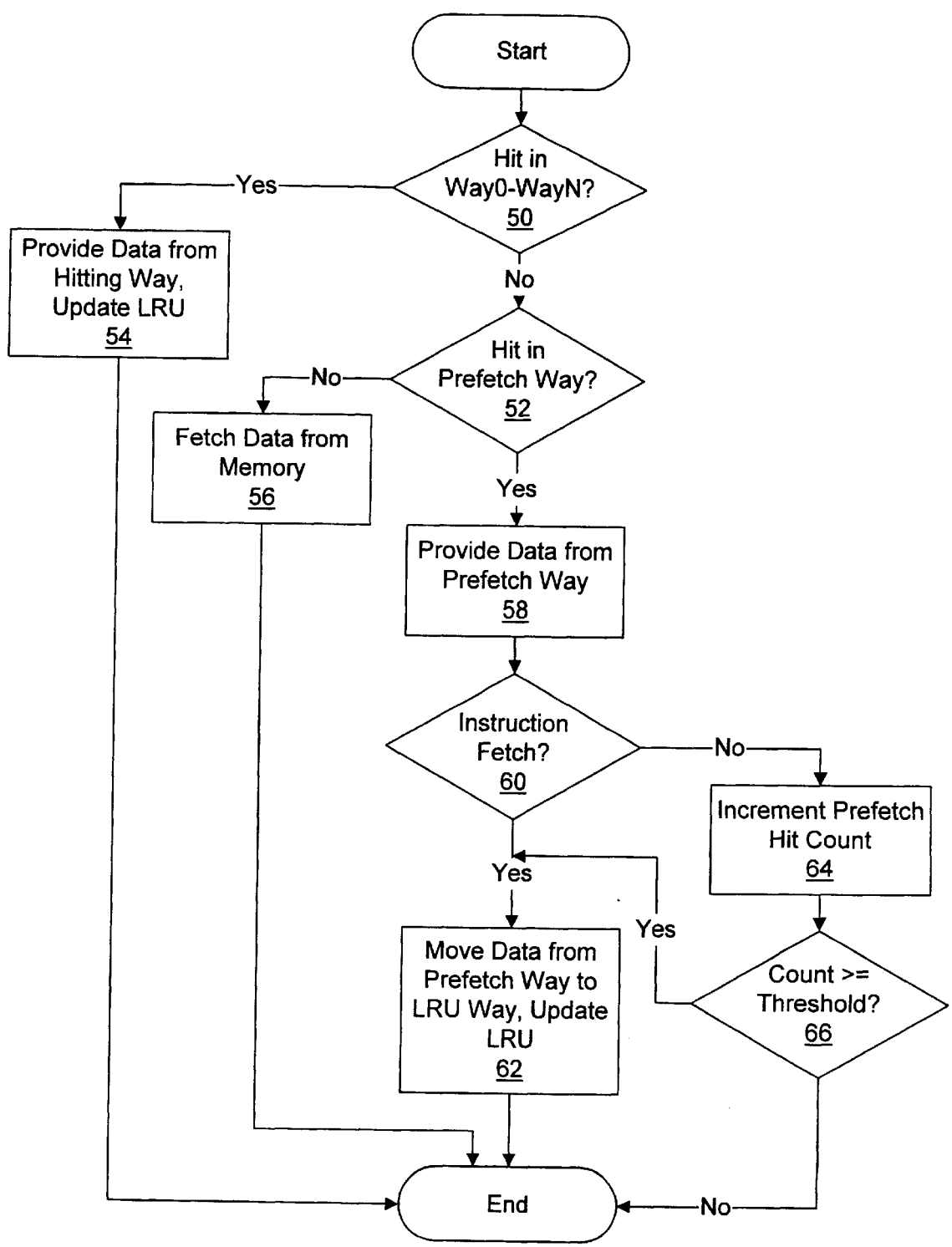
FIG. 3 is a flowchart illustrating prefetch cache line movement according to one embodiment of a cache shown in FIG. 1 or FIG. 2.

Turning next to FIG. 3, a flowchart illustrating certain actions performed by control unit 20 according to one embodiment of control unit 20 is shown. The flowchart illustrated in FIG. 3 illustrates actions performed in response to a request from microprocessor 12 (FIG. 1) or microprocessor core 44 (FIG. 2).

Control unit 20 determines if the request hits in cache storage 18 (decision blocks 50 and 52). It is noted that the combination of decision blocks 50 and 52 is a determination of hit/miss in cache storage 18, according to the present embodiment. However, the decision blocks are shown separately in FIG. 3 for clarity. If the request hits in one of ways 30A–30N, then control unit 20 provides the data from the hitting way (step 54). Additionally, control unit 20 updates the LRU data of the corresponding row to identify the accessed way as the most recently used, etc. On the other hand, if the request misses cache storage 18, then control unit 20 initiates a fetch of the requested cache line from the memory (step 56). Since the requested cache line is not a prefetch, control unit 20 allocates the LRU way of ways 30A–30N for storing the cache line fetched from the memory.

If a hit is detected within prefetch way 32, the requested instruction or data bytes are provided in response to the request (step 58). In addition, control unit 20 determines if the request is for instructions or data (decision block 60). In the embodiment of FIG. 1, for example, control unit 20 is informed of the instruction fetch/data fetch nature of the request via control signals upon CPU bus 28. If the request is for instructions, then the cache line is moved from prefetch way 32 to one of ways 30A–30N (step 62). Control unit 20 selects the way 30A–30N storing the LRU cache line of ways 30A–30N at the selected index. Additionally, control unit 20 marks the cache line as the most recently used cache line within ways 30A–30N after moving the cache line from prefetch way 32 to the selected way 30A–30N. It is noted that the displaced cache line may be modified with respect to the copy of the displaced cache line within the memory. If the displaced cache line is modified, it is written back to the memory.

On the other hand, if a hit in prefetch way 32 is detected for a data fetch, control unit 20 is configured to increment a prefetch hit counter associated with the cache line for which the hit is detected (step 64). Control unit 20 then compares the incremented prefetch hit count to a threshold value (decision block 66). If the incremented prefetch hit count is greater than or equal to the threshold value, then step 62 is performed. Otherwise, the prefetch cache line remains stored in prefetch way 32.

The threshold value may be chosen by balancing the likelihood that multiple references to the data cache line are part of a non-recurrent pattern with the likelihood that the prefetch cache line will be replaced within prefetch way 32 prior to a time at which microprocessor 12 or microprocessor core 44 has completed access to the prefetch cache line. The threshold value may be programmable, and may thereby be adjustable for the type of program being executed. If reuse of data is low (such as with many types of floating point applications, for example), then the threshold value may be set higher. If reuse of data is high, then the threshold value may be set lower. Setting the threshold value to one effectively treats accesses to instructions and data in a similar manner. Selection of the threshold value may be related to cache line size and the size of typical operands as well. For example, if the cache line size is 32 bytes and operands are typically 4 bytes, then 8 accesses to the cache line may be performed even if no data reuse is occurring (i.e. there are 8 operands within the cache line). A threshold value of nine may be appropriate for such a case.

For an embodiment of control unit 20 employing actions as shown in FIG. 3, moving of a prefetch cache line from prefetch way 32 to ways 30A–30N occurs as a result of the prefetch cache line being accessed. Therefore, prefetch cache lines (when received from the main memory) may be simply stored into prefetch way 32 at the index indicated by the prefetch address. Additionally, the prefetch hit count may be initialized to zero. A second embodiment of control unit 20, on the other hand, may delay movement of a prefetch cache line from prefetch way 32 to ways 30A–30N. The second embodiment may operate according to the flowcharts shown in FIGS. 4 and 5, for example.

Figure 4:
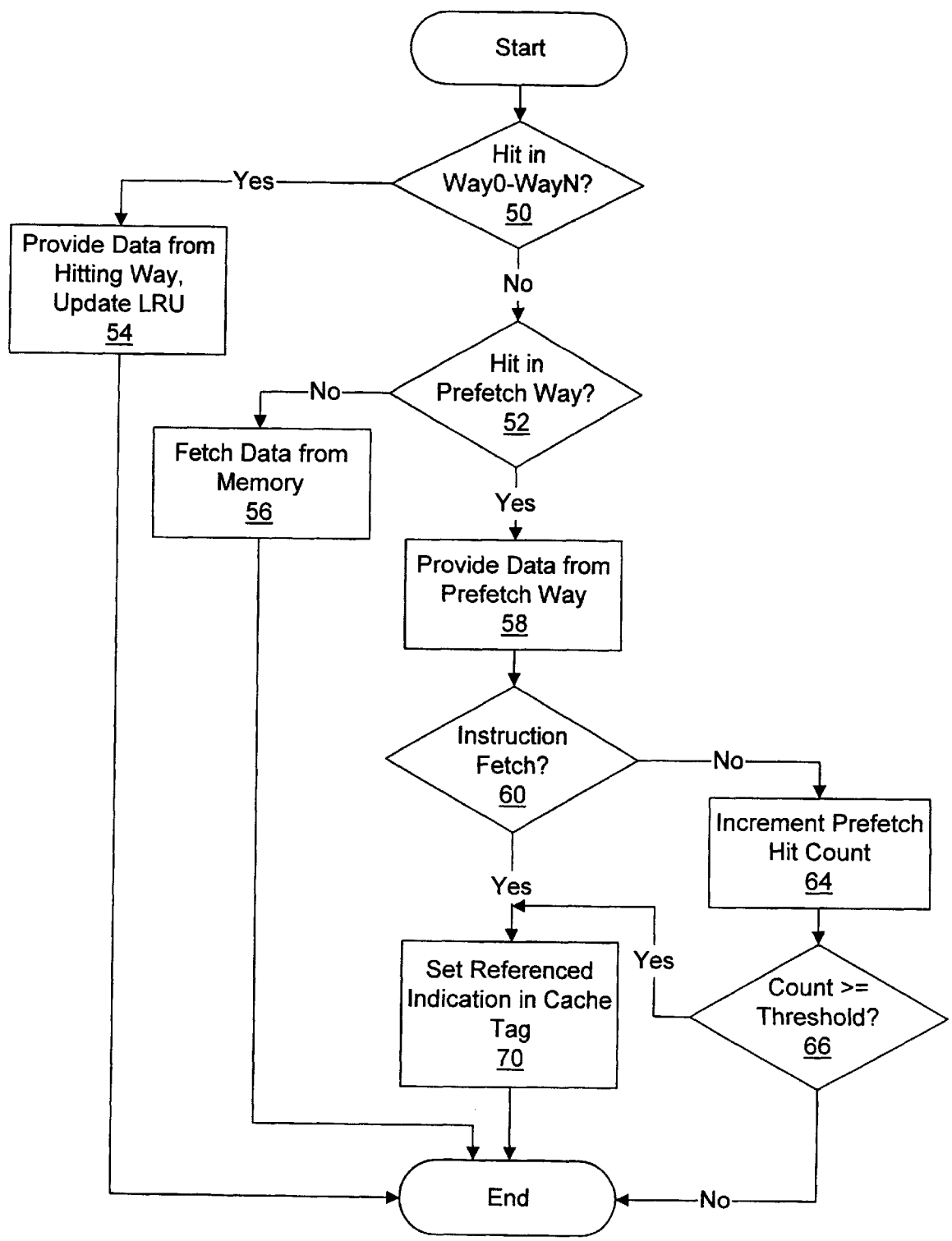
FIGS. 4 and 5 are flowcharts illustrating prefetch cache line movement according to another embodiment of a cache shown in FIG. 1 or FIG. 2.

FIG. 4 is a flowchart of actions performed by the second embodiment of control unit 20 in response to a request received from microprocessor 12 (FIG. 1) or microprocessor core 44 (FIG. 2). Decision blocks 50, 52, 60, and 66 and steps 54, 56, 58, and 64 are similar to the correspondingly numbered elements of FIG. 3. In the interest of brevity, those steps will not be described again with respect to FIG. 4.

Step 62 of FIG. 3 is replaced for the second embodiment of control unit 20. Instead of moving the prefetch cache line from prefetch way 32 to ways 30A–30N upon arriving at step 62, the second embodiment of control unit 20 sets a referenced indication corresponding to the prefetch cache line (step 70). The referenced indication, in a first state, indicates that the cache line has been requested. In a second state, the referenced indication indicates that the cache line was prefetched and has not yet been requested. When the prefetch cache line is fetched from memory and placed into prefetch way 32, the corresponding referenced indication is initialized to the second state.

It is noted that, as shown in FIG. 4, data cache lines are not indicated as accessed until the number of accesses is greater than or equal to the threshold value. Therefore, data cache lines will not be moved into ways 30A–30N until the threshold value is met or exceeded, even though the movement is delayed.

Figure 5:
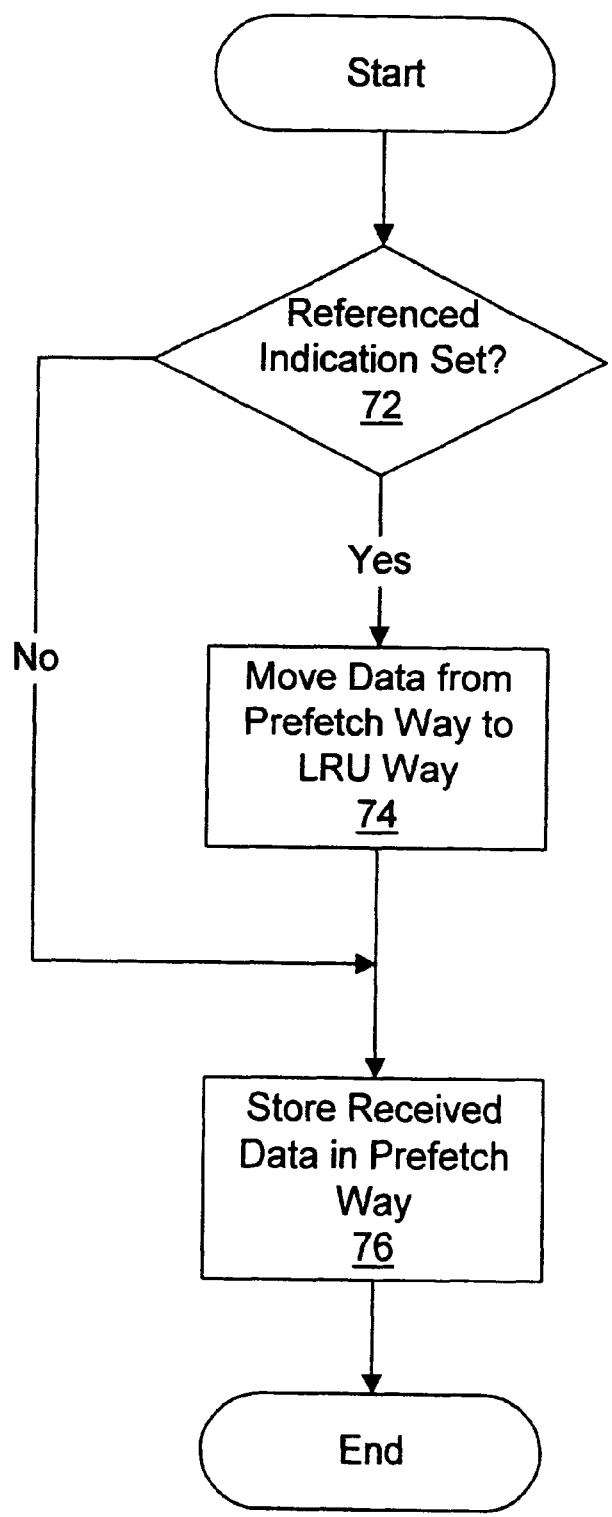

FIG. 5 is a flowchart illustrating the actions of the second embodiment of control unit 20 when a prefetch cache line is received from the memory. Control unit 20 determines if the prefetch cache line stored in prefetch way 32 at the index of the prefetch cache line being received has been accessed by examining the corresponding referenced indication (decision block 72). If the referenced indication is in the first state, the stored prefetch cache line is moved to the way 30A–30N which is storing the LRU cache line at the selected index (step 74). The prefetch cache line is then marked as the most recently used of the cache lines stored within ways 30A–30N.

Whether or not the stored prefetch cache line is moved to a way 30A–30N, the received prefetch cache line is stored into prefetch way 32 (step 76). The referenced indication corresponding to the received prefetch cache line is initialized to the second state.

Figure 6:
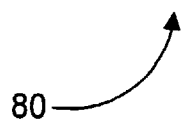
FIG. 6 is a first embodiment of a cache tag for a prefetched cache line.

Turning next to FIG. 6, one embodiment of a cache tag 80 which may be employed for each cache line within prefetch way 32 according to an embodiment of control unit 20 in accordance with FIG. 3 is shown. Cache tag 80 includes an address tag field 82, a state field 84, and a count field 86.

Address tag field 82 stores a portion of the address corresponding to the cache line represented by cache tag 80. In particular, the portion of the address which is not within the index of the address or the offset of the address is stored in address tag field 82. The portion of the address stored in address tag field 82 is compared to a corresponding portion of an address accessing the cache in order to determine if a hit or miss is detected in the cache. If the comparison indicates a match, then a hit may be detected. If the comparison indicates no match, then a miss may be detected.

State field 84 stores the state of the corresponding cache line. State field 84 includes at least an indication of whether or not the cache line is valid. According to one embodiment, state field 84 may encode any of the modified, exclusive, shared and invalid states of the MESI encoding. Other encodings may be used as well.

Count field 86 stores the prefetch hit counter corresponding to the cache line. As mentioned above, count field 86 is initialized with a value of zero when the corresponding prefetch cache line is stored into prefetch way 32. The value is then incremented as data accesses to the prefetch cache line are performed.

Figure 7:
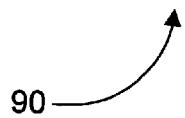
FIG. 7 is a second embodiment of a cache tag for a prefetched cache line.

Turning now to FIG. 7, one embodiment of a cache tag 90 which may be employed for each cache line within prefetch way 32 according to an embodiment of control unit 20 in accordance with FIGS. 4 and 5 is shown. Cache tag 90 includes address tag field 82, state field 84, and count field 86 similar to cache tag 80. Additionally, cache tag 90 includes a referenced field 92. Referenced field 92 stores the referenced indication described above. According to one embodiment, referenced field 92 comprises a bit. The bit may be indicative of the first state when set and the second state when clear. Alternatively, the bit may be indicative of the second state when set and the first state when clear.

In accordance with the above disclosure, a cache has been shown which includes a plurality of ways and at least one prefetch way. Prefetched cache lines are stored into the prefetch way, thereby avoiding pollution in the remaining ways of the cache. The cache includes a control unit for determining when to move prefetch cache lines from the prefetch way or ways to the remaining ways. Advantageously, prefetch cache lines are retained as non-prefetch cache lines if referenced by the microprocessor to which the cache is attached. Prefetch cache lines which are not referenced may be replaced with other prefetch cache lines.

Numerous variations and modifications will become apparent to those skilled in the art once the above disclosure is fully appreciated. It is intended that the following claims be interpreted to embrace all such variations and modifications.

What is claimed is:

1. A cache coupled to receive an input address, said cache comprising:
    a storage including at least a first way for storing cache lines and at least a prefetch way for storing prefetch cache lines, wherein said storage is further configured to store a plurality of counters, each of said plurality of counters corresponding to a respective prefetch cache line in said prefetch way; and
    a control unit coupled to said storage, said control unit configured to update a first counter of said plurality of counters responsive to said input address hitting a first prefetch cache line corresponding to said first counter, and wherein said control unit is configured to move said first prefetch cache line to said at least said first way responsive to said first counter crossing a threshold value.

2. The cache as recited in claim 1 wherein said control unit is configured to increment said counter responsive to said input address hitting said first prefetch cache line, and wherein said control unit is configured to move said first cache line responsive to said first counter exceeding said threshold value.

3. The cache as recited in claim 1 wherein said threshold value is programmable.

4. The cache as recited in claim 1 wherein said control unit is configured to delay moving said first prefetch cache line until said first prefetch cache line is selected for replacement by another prefetch cache line.

5. The cache as recited in claim 4 wherein said storage is further configured to store a plurality of referenced indications, each of said plurality of referenced indications corresponding to said respective prefetch cache line in said prefetch way, and wherein said control unit is configured to set a first referenced indication of said plurality of referenced indications to a referenced state responsive to said first counter crossing said threshold.

6. The cache as recited in claim 5 wherein said control unit is configured to move said first prefetch cache line further responsive to said first referenced indication being in said referenced state.

7. The cache as recited in claim 6 wherein said control unit is further configured to store said first prefetch cache line into said prefetch way responsive to a prefetch of said first prefetch cache line from memory, and wherein said control unit is configured to initialize said first referenced indication to a non-referenced state in response to storing said first prefetch cache line.

8. The cache as recited in claim 1 wherein said at least a first way comprises a plurality of ways including said first way, and wherein said control unit is configured to is configured to maintain a replacement policy among said plurality of ways, and wherein said control unit is configured to move said first prefetched cache line into one of said plurality of ways responsive to said replacement policy.

9. The cache as recited in claim 8 wherein said prefetch way is excluded from said replacement policy.

10. The cache as recited in claim 8 wherein said replacement policy comprises a least recently used (LRU) replacement policy.

11. The cache as recited in claim 1 wherein said control unit is configured to store said first prefetch cache line into said prefetch way responsive to a prefetch of said first prefetch cache line from memory.

12. The cache as recited in claim 11 wherein said control unit is configured to initialize said first counter responsive to storing said first prefetch cache line into said prefetch way.

13. A method comprising:

receiving an input address into a cache;

detecting a hit in a first cache line of a prefetch way of said cache responsive to said receiving, said prefetch way storing only prefetch cache lines;

updating a counter corresponding to said first cache line responsive to said detecting; and moving said first cache line from said prefetch way to a first way of said cache responsive to said counter crossing a threshold value.

14. The method as recited in claim 13 wherein said updating said counter comprises incrementing said counter, and wherein said counter crossing said threshold value comprises said counter exceeding said threshold value.

15. The method as recited in claim 13 further comprising programming said threshold value.

16. The method as recited in claim 13 wherein said moving is further responsive to selecting said first cache line for replacement in said prefetch way by another prefetch cache line.

17. The method as recited in claim 13 wherein said moving comprises setting a referenced indication to a referenced state responsive to said counter crossing said threshold value.

18. The method as recited in claim 17 wherein said moving further comprises:

selecting said first cache line for replacement in said prefetch way by another prefetch cache line; and moving said first cache line from said prefetch way to said first way responsive to said selecting and further responsive to said referenced indication being in said referenced state.

19. The method as recited in claim 13 further comprising storing said first cache line into said prefetch way responsive to prefetching said first cache line from a memory.

20. The method as recited in claim 19 further comprising initializing said counter responsive to said storing.

* * * * *